US009880541B2

(12) United States Patent
Stone et al.

(10) Patent No.: US 9,880,541 B2
(45) Date of Patent: Jan. 30, 2018

(54) PROVIDING INSTRUCTIONS TO A MAINFRAME SYSTEM

(71) Applicant: International Business Machines Corporation, Armonk, NY (US)

(72) Inventors: Colin C. Stone, Hursley (GB); John D. Taylor, Hursley (GB); Gary O. Whittingham, Hursley (GB); Joseph R. Winchester, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 14/394,769

(22) PCT Filed: Apr. 3, 2013

(86) PCT No.: PCT/IB2013/052650
§ 371 (c)(1),
(2) Date: Oct. 16, 2014

(87) PCT Pub. No.: WO2013/156886
PCT Pub. Date: Oct. 24, 2013

(65) Prior Publication Data
US 2015/0100136 A1 Apr. 9, 2015

(30) Foreign Application Priority Data
Apr. 17, 2012 (GB) .................................. 1206726.0

(51) Int. Cl.
*G05B 19/042* (2006.01)
*G06F 9/455* (2006.01)

(52) U.S. Cl.
CPC ..... *G05B 19/0426* (2013.01); *G06F 9/45512* (2013.01); *G05B 2219/23039* (2013.01)

(58) Field of Classification Search
CPC ...... G05B 19/0426; G05B 2219/23039; G06F 9/45512
(Continued)

(56) References Cited

U.S. PATENT DOCUMENTS 4,805,134 A * 2/1989 Calo ....................... G06F 9/468
5,553,235 A * 9/1996 Chen ................... G06F 11/2294
714/20

(Continued)

FOREIGN PATENT DOCUMENTS

JP H03214325 A 9/1991
JP H11305998 A 11/1999
(Continued)

OTHER PUBLICATIONS

Masaaki et al, "Computer System Machine translation of JP 11-305998", Nov. 1999, JplatpaT, pp. 5.*
(Continued)

*Primary Examiner* — Miranda Huang
*Assistant Examiner* — Olvin Lopez Alvarez
(74) *Attorney, Agent, or Firm* — Steven Chiu (57) ABSTRACT

Method and system are provided for providing instructions to a mainframe system. The method at a client system includes constructing a job control language (JCL) job embedded with an interpreted language program to provide instructions to a mainframe operating system. The method at a mainframe system includes: receiving a job control language (JCL) job embedded with an interpreted language program to provide instructions to a mainframe operating system; copying the interpreted language program to a transient executable area; and executing the interpreted language program.

20 Claims, 5 Drawing Sheets

(58) Field of Classification Search
USPC .......................................................... 700/18
See application file for complete search history.

(56) References Cited

U.S. PATENT DOCUMENTS

| | | | | |
|---|---|---|---|---|
| 5,812,846 | A | 9/1998 | Dowedeit | |
| 6,177,957 | B1 | 1/2001 | Anderson | |
| 6,522,346 | B1* | 2/2003 | Meyer | G05B 19/0426 700/17 |
| 7,334,015 | B1 | 2/2008 | Phillips | |
| 7,526,286 | B1* | 4/2009 | Allen, Jr. | H04M 1/72533 455/411 |
| 7,647,370 | B1 | 1/2010 | Liu et al. | |
| 7,768,662 | B2* | 8/2010 | Berndt | G06F 3/1222 358/1.14 |
| 8,234,330 | B2* | 7/2012 | Hall | H04L 41/0813 709/203 |
| 2003/0084070 | A1* | 5/2003 | Kliewe | G06F 8/00 |
| 2003/0146928 | A1* | 8/2003 | Finster | G06F 17/245 715/721 |
| 2004/0111635 | A1* | 6/2004 | Boivie | H04L 63/02 726/22 |
| 2005/0071446 | A1* | 3/2005 | Graham | H04L 12/4641 709/223 |
| 2006/0036398 | A1* | 2/2006 | Funge | G06N 5/02 702/179 |
| 2007/0011740 | A1* | 1/2007 | Davis | H04L 63/0227 726/22 |
| 2007/0277174 | A1* | 11/2007 | Cai | G06F 9/5038 718/101 |
| 2008/0168421 | A1* | 7/2008 | Meijer | G06F 8/31 717/106 |
| 2009/0007254 | A1* | 1/2009 | Aoki | H04L 29/12009 726/14 |
| 2011/0283019 | A1 | 11/2011 | Bennett et al. | |
| 2012/0017119 | A1 | 1/2012 | Ghosh et al. | |
| 2012/0115477 | A1* | 5/2012 | Ali | H04L 65/1016 455/435.1 |
| 2014/0019613 | A1* | 1/2014 | Ishikawa | G06F 11/20 709/224 |
| 2014/0215642 | A1* | 7/2014 | Huxham | H04L 63/0464 726/28 |

FOREIGN PATENT DOCUMENTS

| | | | | |
|---|---|---|---|---|
| JP | 2002334058 | * | 11/2002 | ............ G06F 15/00 |
| JP | 2003303098 | A | 10/2003 | |
| WO | WO0208838 | A1 | 1/2002 | |

OTHER PUBLICATIONS

Madoka et al, "Data Processor, Machine Translation of JP 2003-303098",EPO, Oct. 2003, pp. 13.*
MVSforums.com, "How to submit a batch job in a Rexx program?", 2002, http://www.mvsforums.com/helpboards/viewtopic.php?t=42&highlight=intrdr, pp. 7.*
IBMmainframes.com, "Compile JCL for REXX program", 2005, http://ibmmainframes.com/about6992.html, pp. 3.*
WaybackMachine, "JCL", Oct. 2010, pp. 1.*
Parziale et al, "Implementing REXX Support in SDSF", Jun. 2007, pp. 340.*
IBM, "IBM Knowledge Center Template steps", downloaded Apr. 17, 2017, p. 1.*
Ebbers et al, "Introduction to the New Mainframe: IBM z/VSE Basics", Mar. 2016, pp. 33.*
The Univeristy of CHicago ITServices, "Mainframe Using TSO and ISPF", downloaded Apr. 17, 2017, pp. 14.*
International Search Report and Written Opinion, dated Jul. 2, 2013, regarding Application No. PCT/IB2013/052650, 8 pages.
"TSO/E REXX Reference, Version 2, Release 1", IBM Corporation, © 2013, 578 pages. https://www.ibm.com/support/knowledgecenter/SSLTBW_2.1.0/com.ibm.zos.v2r1.ikja300/abstract.htm.
"TSO/E REXX User's Guide, Version 2, Release 1", IBM Corporation, © 2013, 232 pages. https://www.ibm.com/support/knowledgecenter/SSLTBW_2.1.0/com.ibm.zos.v2r1.ikjc300/abstract.htm.
"MVS JCL Reference, Version 2, Release 1", IBM Corporation, © 2013, 720 pages. https://www.ibm.com/support/knowledgecenter/SSLTBW_2.1.0/com.ibm.zos.v2r1.ieab600/abstract.htm.
"MVS JCL User's Guide, Version 2, Release 1", IBM Corporation, © 2013, 318 pages. https://www.ibm.com/support/knowledgecenter/en/SSLTBW_2.1.0/com.ibm.zos.v2r1.ieab500/abstract.htm.
State Intellectual Property Office of PRC Notification of Second Office Action, dated May 5, 2017, regarding Application No. 201380020279.3, 9 pages.

* cited by examiner

PROVIDING INSTRUCTIONS TO A MAINFRAME SYSTEM

CROSS-REFERENCE TO RELATED APPLICATIONS

This application claims priority under 35 U.S.C. § 371 to International Application No. PCT/IB2013/052650 filed Apr. 3, 2013, which claims priority to United Kingdom Patent Application No. GB1206726.0, filed Apr. 17, 2012. The contents of both aforementioned applications are incorporated herein by reference.

FIELD OF INVENTION

This invention relates to the field of providing instructions to a mainframe system. In particular, the invention relates to providing instructions to a mainframe system without using an additional component in the form of a server installed component or separate terminal.

BACKGROUND OF INVENTION

Mainframes have grown up with dumb terminals as the primary way to access system functionality. There has been a growth of newer devices, such as personal computers with graphical user interface (GUI) operating systems, mobile devices such as smart phones and tablets, or mashup devices used in situational applications. Providing a way to drive the mainframe through these heterogeneous client devices, as well as future form factors such as mobile and touch devices, is key to continued existence and relevance of the mainframe.

The legacy of 45 years of functionality in mainframes means that there are hundreds of commands which are already proven, reliable and trusted to perform tasks, such as, start address spaces, query system information, or respond to system events. A solution is required which unlocks the commands to access through any client device, without incurring the overhead that comes through explicit client/server boundary configuration or coupling.

The IBM® 3270 (IBM is a trade mark of International Business Machines Corporation, registered in many jurisdictions worldwide) is a class of block oriented terminals made by IBM since 1972 (known as "display devices") normally used to communicate with IBM mainframes.

Current implementations either use IBM 3270 interfaces or a server component incurring problems described below.

The client implements an IBM 3270 data stream, or screen scrapes an IBM 3270 terminal emulator and uses that session to issue the commands.

Drawbacks:

(A) The user's user id is required to log into the system, meaning that the user id could not be used separately to log into the system. This means that if the user is logged into a separate 3270 session then either they will be logged off that session, or the client will be unable to issue the commands, making them less productive. Current work-arounds require the creation of multiple user ids which has a cost overhead and is less flexible.

(B) Interpreting and responding to a 3270 data stream requires significant logic. This means any such implementation is costly to develop, test and maintain.

(C) Screen scraping adds to complexity and requires a coupling between the client code and the server 3270 panels. If the panels change without modifications to the client, then the application fails. This problem makes this approach brittle, difficult to maintain and unreliable.

In server stored programs, the client sends Job Control Language (JCL) that executes a stored program with command(s) passed in the JCL. Job Control Language (JCL) is a scripting language used on mainframe operating systems to instruct the system on how to run a batch job or start a subsystem.

Drawbacks:

(D) This approach requires one or more programs to be pre-installed on the server. This introduces cost and complexity of configuration and restricts the ability of the client to attach to any server and execute commands.

(E) Any maintenance changes may have to be applied to both the client and all targeted servers. This introduces cost and complexity of configuration.

(F) Server configuration changes are closely controlled and managed by system administrators and often constrained to fixed maintenance windows. This means that updates are delayed and incur a higher deployment cost.

Therefore, there is a need in the art to address the aforementioned problems.

BRIEF SUMMARY OF THE INVENTION

According to a first aspect of the present invention there is provided a method at a client system for providing instructions to a mainframe system, comprising: constructing a job control language (JCL) job embedded with an interpreted language program to provide instructions to a mainframe operating system.

According to a second aspect of the present invention there is provided a method at a mainframe system for receiving instructions, comprising: receiving a job control language (JCL) job embedded with an interpreted language program to provide instructions to a mainframe operating system; copying the interpreted language program to a transient executable area; and executing the interpreted language program.

According to a third aspect of the present invention there is provided a client system for providing instructions to a mainframe system, comprising: a processor; a component for constructing a job control language (JCL) job embedded with an interpreted language program to provide instructions to a mainframe operating system.

According to a fourth aspect of the present invention there is provided a mainframe system for receiving instructions, comprising: a job entry subsystem for receiving a job control language (JCL) job embedded with an interpreted language program to provide instructions to a mainframe operating system; a copying component for copying the interpreted language program to a transient executable area; and an interpreted language executing component for executing the interpreted language program.

According to a fifth aspect of the present invention there is provided computer program stored on a computer readable medium and loadable into the internal memory of a digital computer, comprising software code portions, when said program is run on a computer, for performing the method of any the first aspect of the present invention.

According to a sixth aspect of the present invention there is provided a computer program stored on a computer readable medium and loadable into the internal memory of a digital computer, comprising software code portions, when said program is run on a computer, for performing the method of the second aspect of the present invention.

According to a seventh aspect of the present invention there is provided a method substantially as described with reference to the figures.

According to an eighth aspect of the present invention there is provided a system substantially as described with reference to the figures.

The described aspects of the invention provide the advantage of providing instructions to a mainframe system without using an additional component in the form of a server installed component or separate terminal.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION OF THE DRAWINGS

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are provided for interacting with a mainframe system without using an additional component (e.g. server installed component, separate terminal). More specifically, a solution is provided for constructing a Job Control Language (JCL) job embedded with instructions in an interpreted language (e.g. REXX) that has access to the operating system (z/OS®) of a mainframe (z/OS is a trade mark of International Business Machines Corporation, registered in many jurisdictions worldwide). When the job is submitted to the mainframe, the interpreted language program interacts with the operating system and the embedded instructions are executed.

A client may construct a single JCL job that in-lines instructions in an interpreted language that has access to the operating system application programming interface (API), for example, REXX (Restructure Extended Executor) on z/OS, or Perl (Perl is a trade mark of The Perl Foundation). This JCL is submitted to the server for execution.

While this could be achieved using a non-interpreted language such as Assembler or C, that would require compilation or link-edit steps and/or specification of the location of system libraries. The disadvantage of this approach when compared to the described method is that the client needs explicit information about the server such as the location of specific system libraries. This increases the cost and complexity of configuration and restricts the ability of the client to attach to any server and execute commands. The described method has no such restriction.

Having submitted the JCL to the server for execution, the JCL job may firstly copy the interpreted language payload into a transient executable area from which it can be run, and may then execute the interpreted language before finally deleting the contents from the transient executable area.

The interpreted language program may issue the command or commands (either included in the program sent from the client, or read in from an input step when the interpreted language program is run), capture the responses to these commands, and write the responses to an output step of the JCL job.

Once the job has been submitted, the client may poll the server to check for the completion of the job or may wait a pre-defined time period, and once the job has completed, the output step containing the response to the commands may be read by the client.

Since the interpreted language program is contained in the submitted JCL job, there is no requirement for any code to be pre-installed on the server. This avoids the drawbacks described in D, E and F above in the background section.

As there is no use of the 3270 interface, cost and complexity described in A, B and C above in the background section are avoided.

Figure 1:
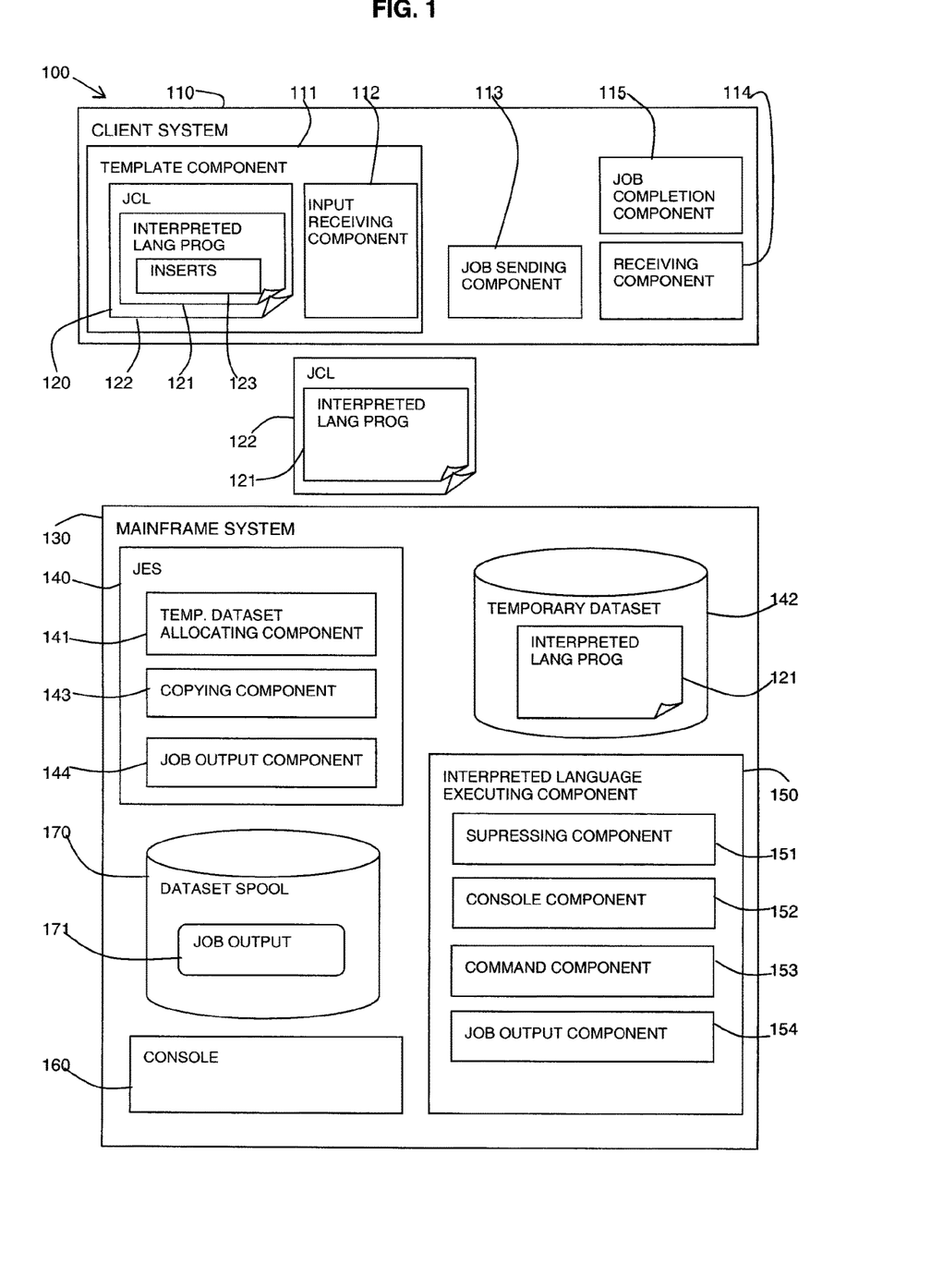
FIG. 1 is block diagram of an example embodiment of a system in accordance with the present invention.

Referring to FIG. 1, a block diagram shows an example embodiment of the described system 100. The system 100 may include a client system 110 for instructing a mainframe system 130.

The client system 110 may be any client device, for example, a personal computer, mobile device such as a smart phone or tablet, a mashup device, or another mainframe, etc.

The client system 110 may include a template component 111 for providing a template 120 to the user. The template 120 may be an interpreted language program 121 embedded in a JCL instruction 122. The template component 111 may include an input receiving component 112 for receiving user inputs in text form and the template 120 may include inserts 123 into which the user inputs are added.

The client system 110 may include a job sending component 113 for sending the completed JCL instruction 122 with the embedded interpreted language program 121 to the mainframe system 130.

The mainframe system 130 may include a job entry subsystem (JES) 140 for receiving jobs into the operating system. The JES 140 may include a temporary dataset allocating component 141 for allocating and deleting a temporary dataset 142 and a copying component 143 for copying the embedded interpreted language program 121 to the temporary dataset 142.

An interpreted language executing component 150 represents the interpreted language used by the program 121. The executing component 150 may include the following components with facilities provided by the interpreted language and used by the interpreted language program 121, namely: a suppressing component 151 for suppressing unsolicited messages, a console component 152 for creating and deactivating a time sharing option (TSO) console 160, a command component 153 for issuing commands and receiving responses to and from the console, and a first job output component 154 for issuing the response to the command(s).

The supressing component 151 may be provided as it is possible that broadcast messages may be sent to all 'users' on the system. If one of these messages were received by the program 121 then the message may not be understood and could cause an error in the program 121. Suppressing unsolicited messages stops these messages being received by the program 121.

The console component 152 may create a console as a means to issue commands to the mainframe operating system and receive replies. This is analogous to creating a command prompt window in an operating system, except the console created here is accessible programmatically and does not have a component that is visible to a user.

The JES 140 may include a second job output component 144 for writing the job output 171 to a dataset spool 170 which may be checked by a receiving component 114 of the client system 110. In one embodiment, the receiving component 114 may poll the mainframe system for a job output. Alternatively, receiving component 114 may include another form of checking component, for example, for checking after a predetermined time period. The client system 110 may also include a job completion component 115 for reading and checking the response.

Figure 2:
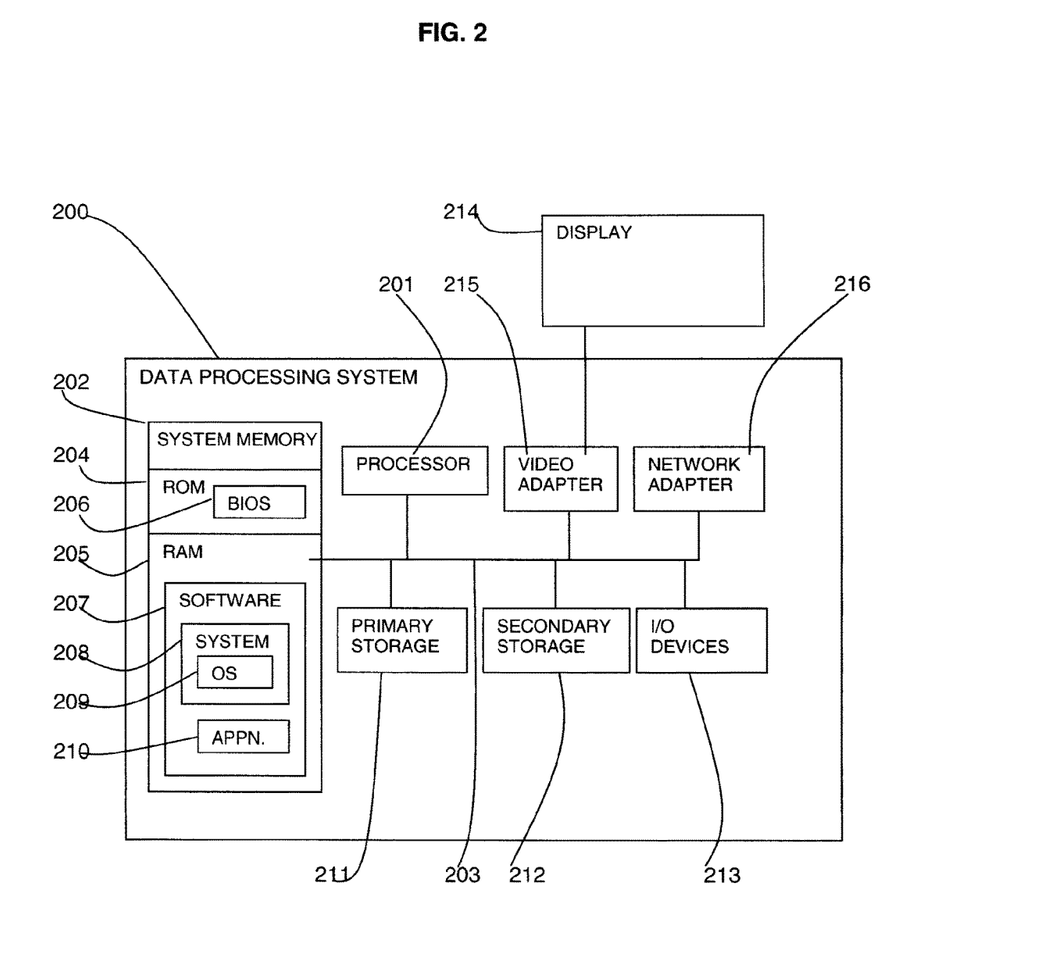
FIG. 2 is a block diagram of an embodiment of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements may include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. Software 207 may be stored in RAM 205 including system software 208 comprising operating system software 209. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 may be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
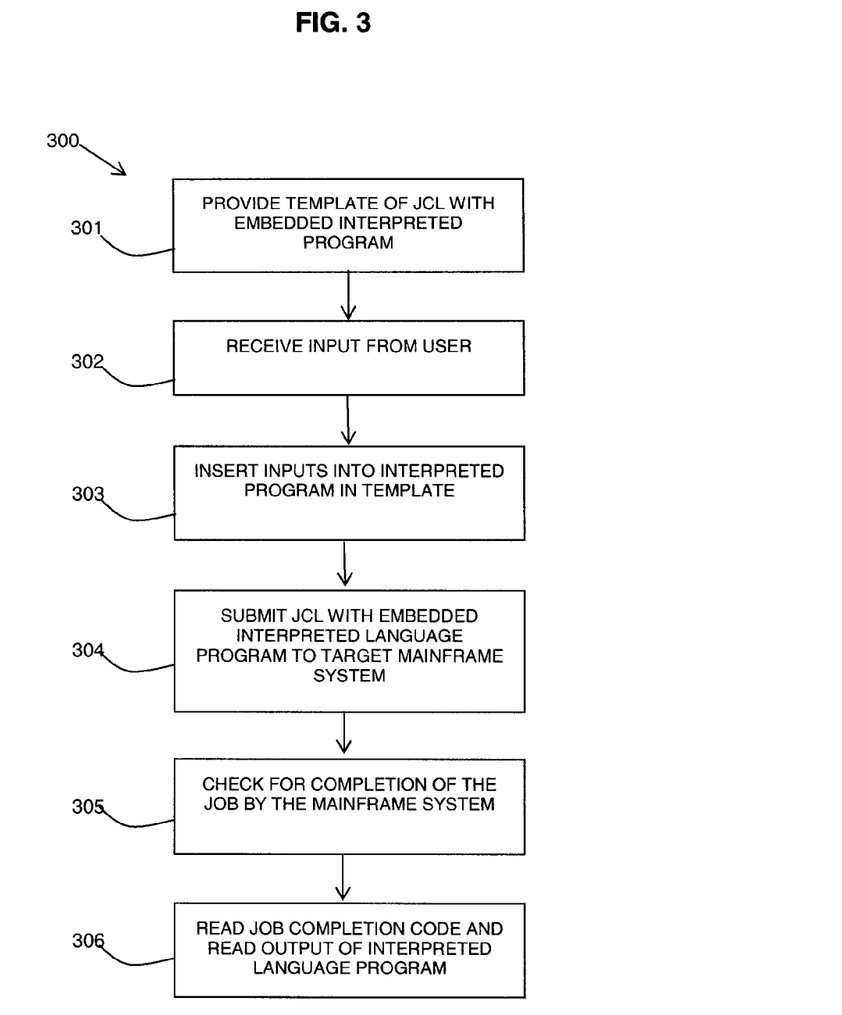
FIG. 3 is a flow diagram of an example embodiment of an aspect of a method in accordance with the present invention.

Referring to FIG. 3, a flow diagram 300 shows an embodiment of the described method at a client system.

A template may be provided 301 to the user of a client system. The template may comprise an interpreted program which is embedded in JCL as an in-line dataset. Input may be received 302 from the user in the form of mainframe operating system command(s) in text form and inserted 303 into the interpreted program of the template in the appropriate place(s). The resulting JCL with embedded interpreted language program may be submitted 304 to a target mainframe system via file transfer protocol (FTP) (or equivalent protocol) for dispatch by the job scheduling system.

The command to be issued to be executed may either be embedded in the interpreted language program, or it may be read in from an input step when the interpreted language program is run. In either case, the command may be added to the JCL/interpreted language program before it is sent to the mainframe.

Checks may be made 305 for completion of the job by the mainframe system. Once the job is completed, the job completion code may be read 306 (to check for errors) and the output step created by the interpreted program is read to capture the response to the command(s).

Figure 4:
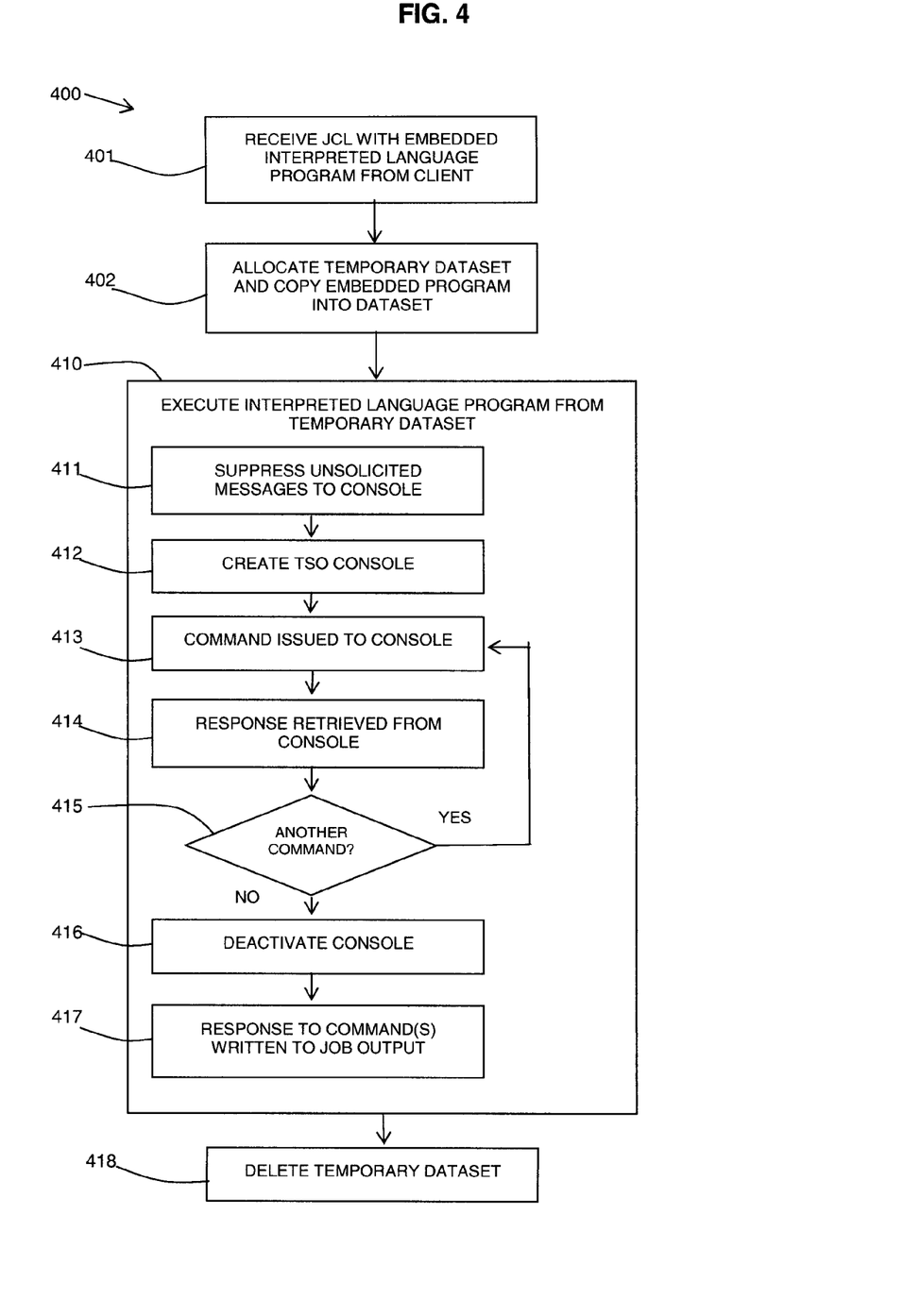
FIG. 4 is a flow diagram of an example embodiment of an aspect of a method in accordance with the present invention.

Referring to FIG. 4, a flow diagram 400 shows an embodiment of the described method at a mainframe system.

The JCL with the embedded interpreted language program from the client may be received 401 by the host system, and may comprise two JOB steps.

Step one may allocate 402 a temporary dataset and may copy the embedded interpreted language program into a member in that dataset.

Step two may execute 410 the interpreted language program from the temporary dataset. The interpreted program may carry out the following. Unsolicited messages to the console to be used may be suppressed 411. A TSO console may be created 412 from which commands can be issued. A command may be issued 413 to the console and the command response may be retrieved 414 from the console, for example, using the CART (Command and Response Token) mechanism to relate responses to the commands that they were issued for.

It may be determined 415 if there is another command. If so, steps 413 and 414 of issuing the command and retrieving the response are repeated. If there are no more commands, the console may be deactivated 416.

The response(s) from the command(s) may be written 417 to a job output step. The response may be richer than simply the command response(s).

On completion of step two 410, the temporary dataset may be automatically deleted 418.

The following is an example of a JCL template with embedded REXX program.

Template JCL:

```
//PRECOPY      EXEC  PGM=IEBUPDTE,PARM=NEW
//SYSUT2       DD DISP=(,PASS),UNIT=SYSDA,SPACE=
              (TRK,(3,1,1)),
//             LRECL=80,RECFM=FB,DSORG=PO
//SYSPRINT    DD  DUMMY
//SYSIN       DD *
./ ADD NAME=CMDPGM
/* REXX */
:
: REXX program to issue command and retrieve response
:
/*
//*
//RUN        EXEC PGM=IKJEFT01,PARM='%CMDPGM',
            COND=(0,NE)
//SYSEXEC    DD  DSN=*.PRECOPY.SYSUT2,DISP=
            (OLD,DELETE)
//SYSTSPRT   DD  SYSOUT=*
//REXXOUT    DD  SYSOUT=*
//SYSTSIN    DD  DUMMY
```

In the embodiment in which a command is read in from an input step when the interpreted language program is run, the client would have to add a suitable jobcard to the start of the template JCL (such as the sample JCL given above). A very simple jobcard would be:

//JOBNAME JOB

Figure 5:
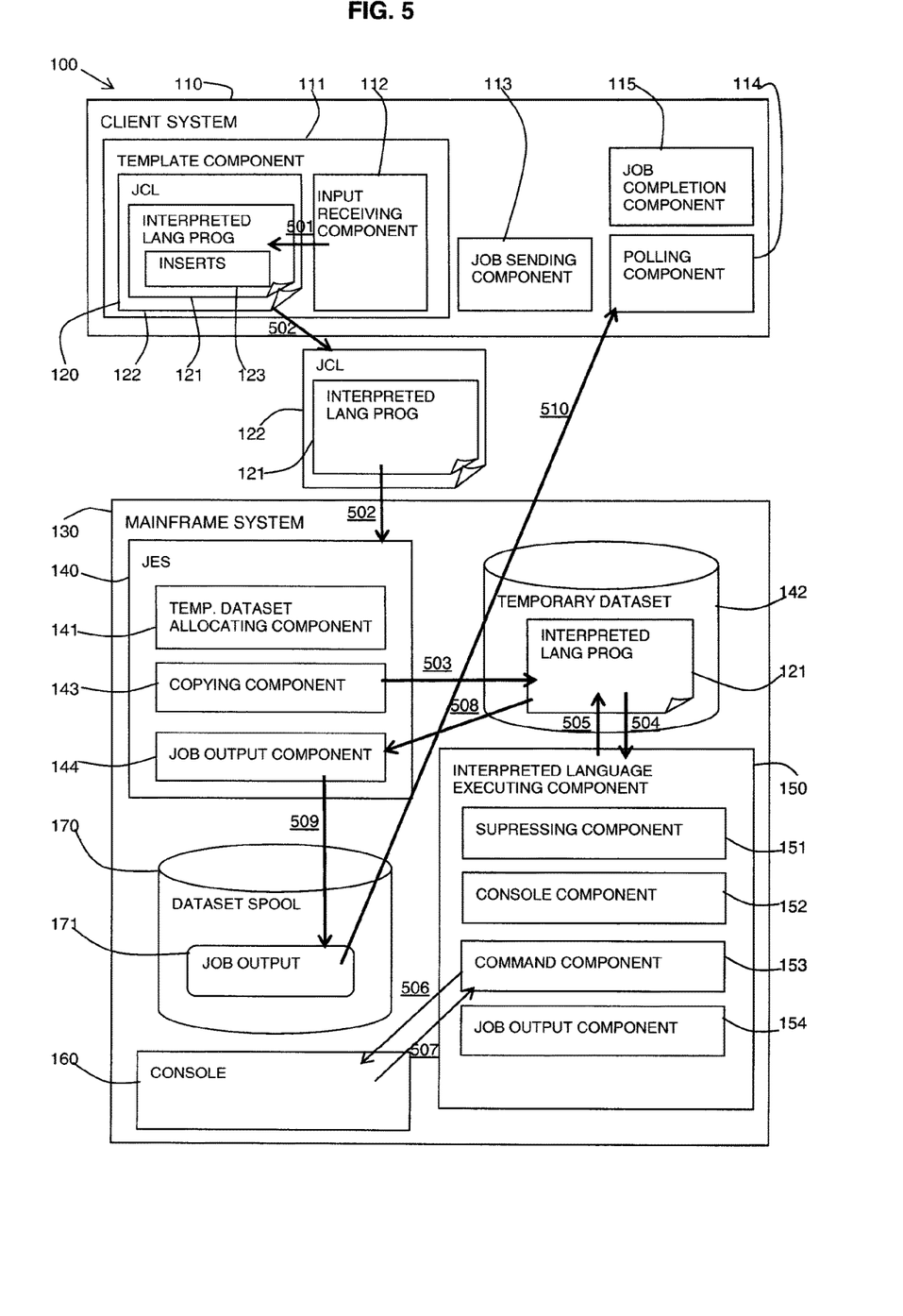
FIG. 5 is a schematic diagram showing a flow of an embodiment of a method in accordance with the present invention in relation to the system components.

Referring to FIG. 5, a schematic diagram 500 shows an embodiment of the described method in the context of the example system of FIG. 1.

A user may add a command 501 at a client system 110 to an interpreted language program 121 embedded in a JCL instruction 122. The JCL instruction 122 may be submitted 502 as a job to a JES 140 of a mainframe system 130.

The JES 140 copies 503 the interpreted language program 121 to a temporary dataset 142 from which it is executed 504, 505 by an interpreted language executing component 150. The interpreted language executing component 150 creates and issues commands to 506 a console 160 and receives 507 responses back from the console 160.

The job output of the interpreted language program 121 is sent 508 to the JES 140 and to a data set spool 509 from which it is polled 510 by a polling component 114 at the client system 110.

This disclosure describes a process to allow commands to be issued from a client without requiring a server component or a 3270 session.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

The invention claimed is:

1. A method at a client system for providing instructions to a mainframe system, the method comprising:
   receiving, by a client device of the client system, user inputs for a Job Control Language (JCL) template with an embedded Restructure Extended Executor (REXX) program that includes mainframe operating system commands to create a console to issue the mainframe operating system commands of the embedded REXX program to a mainframe operating system of the mainframe system and receive responses to the mainframe operating system commands, suppress unsolicited broadcast messages to the console to stop the unsolicited broadcast messages from being received by the embedded REXX program, issue the mainframe operating system commands of the embedded REXX program to the console, retrieve the responses to the mainframe operating system commands of the embedded REXX program issued from the console, deactivate the console in response to determining that the mainframe operating system commands of the embedded REXX program have all been issued, and delete a transient executable area into which the embedded REXX program was copied in response to writing the responses to a job output;
   constructing, by the client device inserting the user inputs into the embedded REXX program in the JCL template, a JCL job that includes the embedded REXX program in the JCL template to provide instructions to the mainframe operating system having console support for embedded REXX program, wherein embedded REXX program interacts with the mainframe operating system using the console that is accessible programmatically and does not have a component that is visible to the user of the client device, and wherein the JCL job allocates the transient executable area into which the embedded REXX program is copied and from which the embedded REXX program is run, and wherein no REXX code is pre-installed on the mainframe system since the embedded REXX program is included in the JCL job;
   sending, by the client device, the JCL job that includes the embedded REXX program to the mainframe system using a transfer protocol; and
   checking, by the client device, for the responses associated with the embedded REXX program received from the mainframe system when the JCL job that includes the embedded REXX program is executed from the transient executable area by the mainframe system, wherein the responses result from execution of the mainframe operating system commands included the embedded REXX program.

2. The method as claimed in claim 1, wherein the client device inserting the user inputs into the JCL template comprises:
   embedding, by the client device, the mainframe operating system commands to be issued to the mainframe operating system in the embedded REXX program.

3. The method as claimed in claim 1, wherein the mainframe operating system commands to be issued to the mainframe operating system are read in from an input step of the embedded REXX program when the embedded REXX program is run by the mainframe system.

4. The method as claimed in claim 1, further comprising:
obtaining, by the client device, the responses from the JCL job including response from the embedded REXX program when the embedded REXX program is executed by the mainframe system.

5. The method as claimed in claim 1, wherein the JCL template with the embedded REXX program corresponding to the JCL job further comprises predetermined places for insertion of the user inputs in text form.

6. The method as claimed in claim 1, wherein the embedded REXX program is embedded in the JCL job as an in-line dataset.

7. The method as claimed in claim 1, wherein multiple mainframe operating system commands are included in the embedded REXX program and multiple responses are retrieved from the console from execution of the embedded REXX program.

8. A method at a mainframe system for receiving instructions from a client system, the method comprising:
receiving, via a network environment into an operating system including a job entry subsystem of the mainframe system, by at least one processor coupled to memory elements of the mainframe system using a transfer protocol, a job control language (JCL) job that includes an embedded Restructure Extended Executor (REXX) program in a JCL template to provide instructions to the operating system having console support for the embedded REXX program, wherein the embedded REXX program interacts with the operating system using a console that is accessible programmatically and does not have a component that is visible to a user of a client device, and wherein the JCL job allocates a transient executable area of the memory elements into which the embedded REXX program is copied and from which the embedded REXX program is run, and wherein no REXX code is pre-installed on the mainframe system since the embedded REXX program is included in the JCL job, and wherein the embedded REXX program includes mainframe operating system commands to create the console to issue the mainframe operating system commands of the embedded REXX program to the operating system and receive a response to the mainframe operating system commands, suppress unsolicited broadcast messages to the console to stop the unsolicited broadcast messages from being received by the embedded REXX program, issue the mainframe operating system commands of the embedded REXX program to the console, retrieve the response to the mainframe operating system commands of the embedded REXX program issued from the console, deactivate the console in response to determining that the mainframe operating system commands of the embedded REXX program have all been issued, and delete the transient executable area of the memory elements into which the embedded REXX program was copied in response to writing the response to a job output;
copying, by the at least one processor, the embedded REXX program to the transient executable area of the memory elements;
executing, by the at least one processor, program code of embedded REXX program copied into the transient executable area;
suppressing, by the at least one processor, unsolicited broadcast messages to the console to stop the unsolicited broadcast messages from being received by the embedded REXX program;
activating, by the at least one processor, the console support for the embedded REXX program;
checking, by the at least one processor, for completion of the JCL job;
deactivating, by the at least one processor, the console support in response to completion of the JCL job;
reading, by the at least one processor in response to completion of the JCL job, a completion code to check for errors; and
reading, by the at least one processor, output created by execution of the embedded REXX program to capture the response.

9. The method as claimed in claim 8, wherein checking, by the at least one processor, for completion of the JCL job further comprises:
deleting, by the at least one processor, the transient executable area after execution of the embedded REXX program.

10. The method as claimed in claim 8, wherein the embedded REXX program has access to an application programming interface of the operating system of the mainframe system.

11. The method as claimed in claim 8, further comprising:
writing, by the at least one processor, responses to execution of the embedded REXX program as the job output; and
including, by the at least one processor, the job output in a job control language completion code.

12. A client system for providing instructions to a mainframe system, the client system comprising:
at least one processor coupled to memory elements having program code stored thereon, the at least one processor executing the program code to:
receive, by a client device of the client system, user inputs for a Job Control Language (JCL) template with an embedded Restructure Extended Executor (REXX) program that includes mainframe operating system commands to create a console to issue the mainframe operating system commands of the embedded REXX program to a mainframe operating system of the mainframe system and receive responses to the mainframe operating system commands,
suppress unsolicited broadcast messages to the console to stop the unsolicited broadcast messages from being received by the embedded REXX program, issue the mainframe operating system commands of the embedded REXX program to the console, retrieve the responses to the mainframe operating system commands of the embedded REXX program issued from the console, deactivate the console in response to determining that the mainframe operating system commands of the embedded REXX program have all been issued, and delete a transient executable area into which the embedded REXX program was copied in response to writing the responses to a job output;
construct, by the client device inserting the user inputs into the embedded REXX program in the JCL template, a JCL job that includes the embedded REXX program in the JCL template to provide instructions to the mainframe operating system having console support for the embedded REXX program, wherein the embedded REXX program interacts with the mainframe operating system using the console that is accessible programmatically and does not have a component that is visible to the user of the client device, and wherein the JCL job allocates the transient executable area into which the embedded REXX program is copied and from which the embedded REXX program is run, and wherein no REXX code is pre-installed on the mainframe system since the embedded REXX program is included in the JCL job;

send, by the client device, the JCL job that includes the embedded REXX program to the mainframe system using a transfer protocol;

and check, by the client device, for the responses associated with the embedded REXX program received from the mainframe system when the JCL job that includes the embedded REXX program is executed from the transient executable area by the mainframe system, wherein the responses result from execution of the mainframe operating system commands included the embedded REXX program.

13. The client system as claimed in claim 12, wherein the at least one processor further executes the program code to:

obtain, by the client device, the responses from the JCL job including response from the embedded REXX program when the embedded REXX program is executed by the mainframe system.

14. The client system as claimed in claim 12, wherein the JCL template with the embedded REXX program corresponding to the JCL job further comprises predetermined places for insertion of the user inputs in text form.

15. The client system as claimed in claim 12, wherein the embedded REXX program is embedded in the JCL job as an in-line dataset.

16. A mainframe system for receiving instructions from a client system, the mainframe system comprising:

at least one processor coupled to memory elements having program code stored thereon, the at least one processor executing the program code to:

receive, using a job entry subsystem of the mainframe system, a job control language (JCL) job that includes an embedded Restructure Extended Executor (REXX) program in a JCL template to provide instructions to a mainframe operating system having console support for the embedded REXX program, wherein the embedded REXX program interacts with the mainframe operating system using a console that is accessible programmatically and does not have a component that is visible to a user of a client device, and wherein the JCL job allocates a transient executable area of the memory elements into which the embedded REXX program is copied and from which the embedded REXX program is run, and wherein no REXX code is pre-installed on the mainframe system since the embedded REXX program is included in the JCL job, and wherein the embedded REXX program includes mainframe operating system commands to create the console to issue the mainframe operating system commands of the embedded REXX program to the mainframe operating system and receive a response to the mainframe operating system commands, suppress unsolicited broadcast messages to the console to stop the unsolicited broadcast messages from being received by the embedded REXX program, issue the mainframe operating system commands of the embedded REXX program to the console, retrieve the response to the mainframe operating system commands of the embedded REXX program issued from the console, deactivate the console in response to determining that the mainframe operating system commands of the embedded REXX program have all been issued, and delete the transient executable area of the memory elements into which the embedded REXX program was copied in response to writing the response to a job output;

copy, using the job entry subsystem, the embedded REXX program to the transient executable area;

execute program code of the embedded REXX program copied into the transient executable area;

suppress unsolicited broadcast messages to the console to stop the unsolicited broadcast messages from being received by the embedded REXX program;

activate the console support for the embedded REXX program;

check for completion of the JCL job;

deactivate the console support in response to completion of the JCL job;

read a completion code to check for errors in response to completion of the JCL job; and read output created by execution of the embedded REXX program to capture the response.

17. The mainframe system as claimed in claim 16, wherein the at least one processor further executes the program code to:

allocate the transient executable area; and delete the transient executable area after execution of the embedded REXX program.

18. The mainframe system as claimed in claim 16, wherein the at least one processor further executes the program code to:

write responses to the embedded REXX program as the job output; and include the job output in a job control language completion code.

19. A computer program product for providing instructions from a client system to a mainframe system comprising:

a non-transitory computer readable medium having program code stored thereon for execution by at least one processor of the client system to:

receive, by a client device of the client system, user inputs for a Job Control Language (JCL) template with an embedded Restructure Extended Executor (REXX) program that includes mainframe operating system commands to create a console to issue the mainframe operating system commands of the embedded REXX program to a mainframe operating system of the mainframe system and receive responses to the mainframe operating system commands, suppress unsolicited broadcast messages to the console to stop the unsolicited broadcast messages from being received by the embedded REXX program, issue the mainframe operating system commands of the embedded REXX program to the console, retrieve the responses to the mainframe operating system commands of the embedded REXX program issued from the console, deactivate the console in response to determining that the mainframe operating system commands of the embedded REXX program have all been issued, and delete a transient executable area into which the embedded REXX program was copied in response to writing the responses to a job output;

construct, by the client device inserting the user inputs into the embedded REXX program in the JCL template, a JCL job that includes the embedded REXX program in the JCL template to provide instructions to the mainframe operating system having console support for the embedded REXX program, wherein the embedded REXX program interacts with the mainframe operating system using the console that is accessible programmatically and does not have a component that is visible to the user of the client device, and wherein the JCL job allocates the transient executable area into which the embedded REXX program is copied and from which the embedded REXX program is run, and wherein no REXX code is pre-installed on the mainframe system since the embedded REXX program is included in the JCL job;

send, by the client device, the JCL job that includes the embedded REXX program to the mainframe system using a transfer protocol;

and check, by the client device, for the responses associated with the embedded REXX program received from the mainframe system when the JCL job that includes the embedded REXX program is executed from the transient executable area by the mainframe system, wherein the responses result from execution of the mainframe operating system commands included the embedded REXX program.

20. A computer program product for receiving instructions by a mainframe system from a client system comprising:

a non-transitory computer readable medium having program code stored thereon for execution by at least one processor of the mainframe system to:

receive, via a network environment into an operating system including a job entry subsystem of the mainframe system, using a transfer protocol, a job control language (JCL) job that includes an embedded Restructure Extended Executor (REXX) program in a JCL template to provide instructions to the operating system having console support for the embedded REXX program, wherein the embedded REXX program interacts with the operating system using a console that is accessible programmatically and does not have a component that is visible to a user of a client device, and wherein the JCL job allocates a transient executable area into which the embedded REXX program is copied and from which the embedded REXX program is run, and wherein no REXX code is pre-installed on the mainframe system since the embedded REXX program is included in the JCL job, and wherein the embedded REXX program includes mainframe operating system commands to create the console to issue the mainframe operating system commands of the embedded REXX program to the operating system and receive a response to the mainframe operating system commands, suppress unsolicited broadcast messages to the console to stop the unsolicited broadcast messages from being received by the embedded REXX program, issue the mainframe operating system commands of the embedded REXX program to the console, retrieve the response to the mainframe operating system commands of the embedded REXX program issued from the console, deactivate the console in response to determining that the mainframe operating system commands of the embedded REXX program have all been issued, and delete the transient executable area into which the embedded REXX program was copied in response to writing the response to a job output;

copy the embedded REXX program to the transient executable area;

execute instructions comprising program code of embedded REXX program copied into the transient executable area;

activate the console support for the embedded REXX program;

check for completion of the JCL job;

deactivate the console support in response to completion of the JCL job;

read, in response to completion of the JCL job, a completion code to check for errors; and read output created by execution of the embedded REXX program to capture the response.

* * * * *